(No Model.)

C. T. BARNES.
CAR MOVER.

No. 249,819. Patented Nov. 22, 1881.

Attest:
H. H. Schott.
A. R. Brown.

Inventor:
Charles T. Barnes

UNITED STATES PATENT OFFICE.

CHARLES T. BARNES, OF CHICAGO, ILLINOIS, ASSIGNOR OF ONE-HALF TO HOLLIS R. PARKER, OF SAME PLACE.

CAR-MOVER.

SPECIFICATION forming part of Letters Patent No. 249,819, dated November 22, 1881.

Application filed July 11, 1881. (No model.)

*To all whom it may concern:*

Be it known that I, CHARLES T. BARNES, a citizen of the United States, residing at Chicago, in the county of Cook and State of Illinois, have invented a new and useful Improvement in Levers for Moving or Starting Cars, of which the following is a specification.

My invention relates to a lever for moving or starting cars on side tracks, or otherwise; and the objects of my invention are, first, to provide a lever or clutch of a peculiar form, having knobs and a lip, so that the spokes will be grasped at or near the flange; second, to furnish a car-mover lever having a pair of knobs on each side, one knob larger than the other, so that it can be used for a right or left catch or left hold; third, to provide a lip having both corners beveled; fourth, to furnish a bulging side to the lever, to prevent rolling or slipping off; and, fifth, to provide a prong in combination with the knobs of the lever, so as to be used as a pry. I attain these objects by the particular construction, arrangement, and combination of the several parts, as illustrated in the accompanying drawings, in which—

Figure 1:
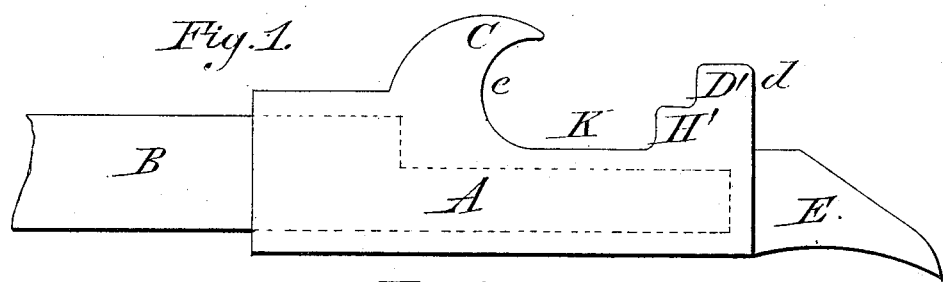
Figure 2:
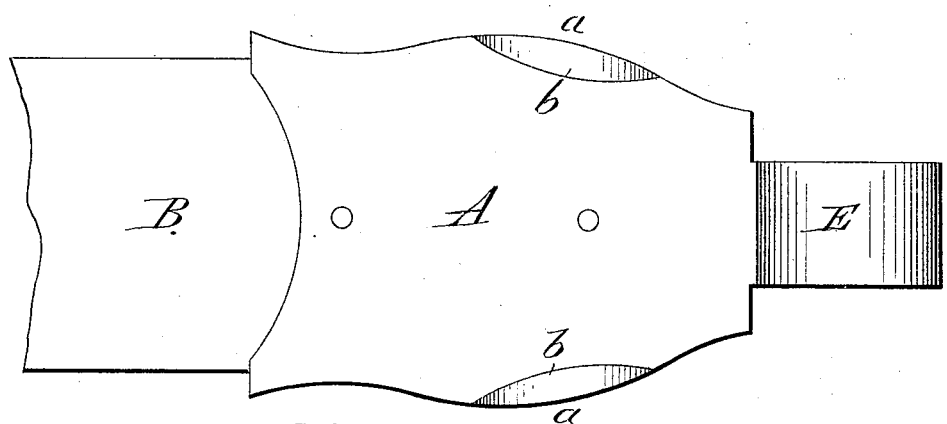
Figure 3:
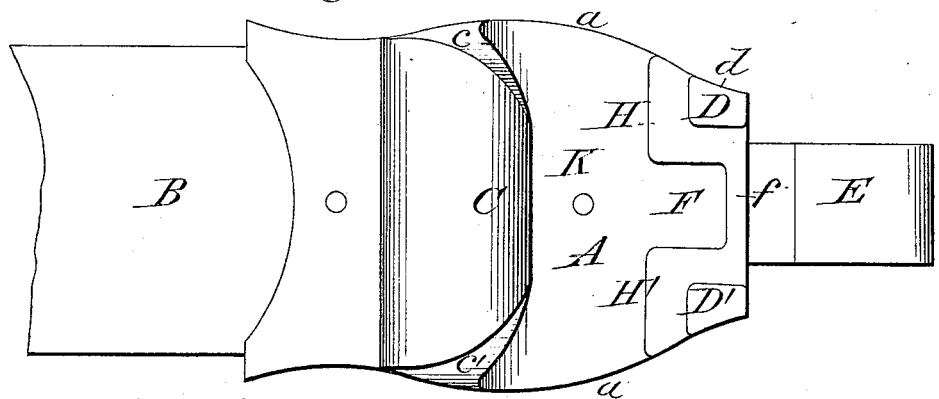
Figure 4:
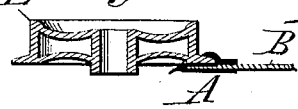
Figure 5:
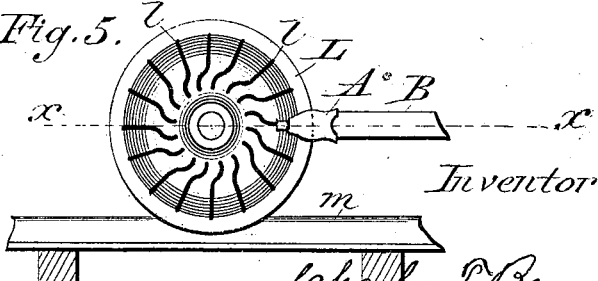

Figure 1 is a side view of my invention. Fig. 2 is a bottom view of the same. Fig. 3 is a top view. Fig. 4 is a section taken on the line $x\ x$ of Fig. 5. Fig. 5 is a view showing a car-wheel with my device attached and in operation.

Similar letters refer to similar parts throughout the several views.

A is the body of my lever, to which the several parts are cast or attached. It is cast sufficiently hollow for the reception of the handle B, as shown by the dotted lines in Fig. 1, and its sides are bulged, having bulges $a\ a$, as shown in Figs. 2 and 3. The lever A has on its bottom sides, $a\ a$, bevels or cut-away $b\ b$, as shown in Fig. 2.

The bevels $b\ b$ are provided so that when the lever is used as a pry it will fit snugly and close. The provision of the bulges $a\ a$ prevents the lever from rolling and slipping off.

C is a hook or lip cast on top of the lever A, with a curve, $e$, as shown in Fig. 1. Both of its ends are beveled or cut away, or cast with bevels $c'\ c'$, as shown in Fig. 3.

H is a large knob cast on top of the lever A, as shown in Fig. 3. It has a straight or horizontal face which faces the hook C, or may be inclined from top toward A and C; its corners being rounded.

H' is the same as H in all respects, except that it is opposite to H, and the knobs H and H' are connected together by an arm, $f$; H, $f$, and H' being cast together with the lever A, so as to form the opening F, as shown in Fig. 3.

D is a little knob at the end of the lever A on the top of the knob H at its outside corner, as shown in Figs. 1 and 3. The top outside corner of D is cut away or beveled, having the bevel $d$.

D' is the same in all respects as the knob D, except that it is on the top of H'. The outside edges of D H and D' H' are the same as A.

K is the space between H H', D D', and C, and is sufficiently large to receive the flange of the wheel and to allow the knobs to take hold of the spokes.

E is a prong or pry, made in the shape as shown in Fig. 1, and cast with the lever A. It may be pointed with steel. The prong E may be cast separately and attached to the lever A in any appropriate manner.

L is an ordinary car-wheel, provided with spokes $l$; and $m$ is a railroad-track.

B is a wooden handle, which fits into the lever A, as shown in Fig. 1. The lever A may be made solid, in which case the handle B is bolted to the back.

The arrangement of my double knobs enables me to take either a right or left firm hold.

The manner of operation is as follows: In order to start a car, I place the lever on a car-wheel, as shown in Fig. 5. The hook or lip C will grasp the flange of the wheel, while the knobs D D' will catch the spokes $l$, and the knobs H H' have a bearing against the flange nearest the outer edge of the spokes, and by lifting on the handle B a firm hold is secured without slipping or wearing the knobs, and free from danger of the lever slipping or rolling off, so common among all other levers previously in use, and the hold can be very readily renewed at pleasure.

My lever can be used for a right or left lift, as may be desired, it not being necessary to go over to the other side of the car to secure a proper hold, as is the necessity and practice of the levers now in common use. Mine is always ready for whatever wheel the mover or starter may approach. There is no danger of breakage with mine, as is common with others, as its particular construction and arrangement of the several parts allow it to throw itself off in the case of an inexperienced operator not properly renewing the hold. The hollow construction of the lever A gives the lever more strength for the material used and makes it lighter and more easily handled.

To use the lever as a pry the part E is inserted under the body of the wheel. The rails will rest between the knobs D and D', and the bevels $b\ b$ will fit closely against the sides of the wheel, and the car will be readily pushed forward.

Having described my invention, what I claim as new, and desire to secure by Letters Patent, is—

1. A device for starting railroad-cars, consisting of a hollow lever, A, having lip or hook C, bulges $a\ a$, bevels $b\ b$, and knobs D H and H' D', brace $f$, prong E, and handle B, substantially as described and shown.

2. In a car-moving device, a lever-body having a double pair of knobs on its face, one knob in each pair being larger than the other, all substantially as described, and for the purpose set forth.

3. In a car-moving lever, the lip C, having bevels $c\ c'$, in combination with the knobs D H and D' H', substantially as shown and described.

4. The car-moving lever A, having bulges $a\ a$ and bevels $b\ b$, substantially as and for the purpose specified.

5. In a car-moving lever, the knobs D D', having corners $d\ d$, in combination with the knobs H H', substantially as set forth.

6. The car-moving lever A, having bulges $a\ a$, bevels $b\ b$, and prong or pry E, substantially as and for the purpose described.

CHARLES T. BARNES.

Witnesses:
HARRY HARRISON,
FRANK JOHNSON.